United States Patent [19]
Perlinski

[11] Patent Number: 5,821,294
[45] Date of Patent: Oct. 13, 1998

[54] WATER-BASED LAMINATING ADHESIVES

[75] Inventor: Witold Perlinski, Middlesex, N.J.

[73] Assignee: National Starch and Chemical Investment Holding Corporation, Wilmington, Del.

[21] Appl. No.: 708,106

[22] Filed: Aug. 30, 1996

[51] Int. Cl.$^6$ ............... C08J 3/00; C08K 3/20; C08L 75/00; C08F 8/30
[52] U.S. Cl. ........... 524/507; 156/331.7; 427/372.2; 427/385.5; 524/539; 524/591; 524/839; 524/840; 525/123; 525/131; 525/417; 525/455
[58] Field of Search ............. 524/591, 839, 524/840, 507, 539; 525/123, 455, 131, 417; 427/372.2, 385.5; 156/331.7

[56] References Cited

U.S. PATENT DOCUMENTS

| | | | |
|---|---|---|---|
| 3,920,598 | 11/1975 | Reiff et al. | 260/29.2 TN |
| 4,013,480 | 3/1977 | Chumbley et al. | 106/213 |
| 4,278,578 | 7/1981 | Carpenter | 260/27 R |
| 4,396,739 | 8/1983 | Sirota et al. | 524/394 |
| 4,408,008 | 10/1983 | Markusch | 524/591 |
| 4,569,981 | 2/1986 | Wenzel et al. | 528/67 |
| 4,659,595 | 4/1987 | Walker et al. | 427/391 |
| 4,762,880 | 8/1988 | Leung | 524/853 |
| 4,801,644 | 1/1989 | Coogan | 524/839 |
| 4,853,061 | 8/1989 | Leung | 156/216 |
| 5,117,059 | 5/1992 | Tylor | 564/252 |
| 5,132,108 | 7/1992 | Narayanan et al. | 424/78.17 |
| 5,264,467 | 11/1993 | DiStefano | 523/218 |
| 5,430,094 | 7/1995 | Gola et al. | 524/507 |

FOREIGN PATENT DOCUMENTS

| | | | |
|---|---|---|---|
| 0 507 407 A1 | 7/1992 | European Pat. Off. | C08K 5/29 |
| 62-182239 | 7/1987 | Japan | C08K 5/34 |
| 1-312430 | 11/1989 | Japan | C08J 175/04 |

OTHER PUBLICATIONS

Zabora, E.P., "Water Borne Coatings", SAMPE, Quarterly, Oct. 1977.

Jansse, Dr. P.L., "Development in waterborne urethane and urethane–acrylate binders", Paint Colour Journal, Jul. 10, 1991, vol. 181, No. 4287.

Rhein Chemie Corporation, Mogadore, OH, "STABAXOL P", Sep. 4, 1991.

Zullig, C., "Lupasol Polyethylenimine", BASF Corporation, Nov. 10, 1995.

Cala, J.A. and Lapkin, M., "Film–Forming High Performance Polyurethane Latices"pp. 431–436.

"UCARLNK® Crosslinkers", UCAR Coatings Resins, Danbury, CT 1991.

Riese, W., "Utility of aziridinyl coreactants", Dow Chemical Europe, Zurich, Switzerland.

Skeist, Irving, "Handbook of Adhesives", Third Edition, Van Nostrand Reinhold, NY, Chapter s 21 and 25.

Dieterich, D., "Aqueous Emulsions, Dispesrsions and solutions of Polyurethanes; Synthesis and Properties", Progress in Organic Coatings, 9 (1981) pp. 281–340.

Rosthauser, JW. and Nachtkamp, K.., "Waterborne Polyurethanes", Adv. Urethane Science and Technology, 1987, pp. 121–162.

Oertel, Gunter, Editor, "Polyurethane Handbook", $2^{nd}$ Edition, Hanser Publishers, pp. 11–128.

"Chemistry of Polymin Production" 2 pages.

"Typical Formulation Using A Urethane Solution", Quinn, Coating and Polymer Specialists.

"Crosslinker CX–100" ICI Polyvinyl Chemicals Inc., Wilmington, MA, Bulletin.

PFAZ–322, IONAC® Crosslinker For Active Hydrogen Polymers, Sybron Chemicals Inc., Birmingham, NJ.

"Polyfunctional Aziridines", Hoechst Celanese, Specialty Chemicals Group.

Primary Examiner—Patrick D. Niland
Attorney, Agent, or Firm—Jane E. Gennaro; Lydia T. McNally

[57] ABSTRACT

A water-based adhesive that is delivered in a stable one-part system comprises (i) an emulsion of a vinyl and/or acrylic polymer; (ii) a water-dispersed ionic or nonionic polyurethane; (iii) a polyethylenimine; and (iv) a carbodiimide.

7 Claims, No Drawings

WATER-BASED LAMINATING ADHESIVES

FIELD OF THE INVENTION

This invention pertains to water-based laminating adhesives suitable for thermoforming, vacuum forming, membrane pressing, or laminating thermoplastic film to plastics, wood board, or particle board. The adhesives comprise a vinyl acetate polymer, a water-dispersed polyurethane, and curing agents.

BACKGROUND OF THE INVENTION

Conventional waterborne laminating technology utilizes a combination of vinyl or acrylic latexes with water dispersed urethane resins containing ionic groups, compounded with aziridine or water dispersible isocyanates as an adhesion promoter or cross-linker to impart the properties of adhesiveness, heat resistance, and water resistance. If the aziridine or water dispersible isocyanate is added at a time removed from the time of use, the crosslinking will cause the system to gel and become unworkable. Thus, these systems are generally delivered as two-part systems with the disadvantage that the user must add in the aziridine or isocyanate just before use.

Several approaches have been taken to make stable one part systems, in general by blocking the ionic groups on the polyurethane with amine or salt. For example:

An article entitled "Water Borne Coatings" by Edward P. Zahora, published in the Sampa Quarterly dated Oct. 1977, discloses that a stable dispersion can be obtained with aqueous polyurethane dispersions with ionic groups, such as carboxylic acid groups, within the backbone of the polymer by raising the pH. At high pH the carboxylic acid groups will not react readily with aziridine because they are in the form of anionic salts. Zahora also teaches that as the water evaporates, the pH becomes acidic, the carboxylic acid groups react with the aziridine, and crosslinking occurs.

An article entitled "Utility of aziridinyl coreactants", by W. Riese, submitted by Dow Chemical Europe, Horgen-Zurich to the FATIPEC Congr. (1972), 11, pages 323–6, teaches that it is possible to make a one-part coating composition with extended pot life from a polymer containing pendant acid functionality and an aziridine crosslinker by admixing a volatile amine into solution with the carboxyl polymer. The amine neutralizes the carboxyl groups limiting their ability to react with the aziridine. When the volatile amine evaporates, the acid and aziridine crosslink, and the system cures.

United States Pat. No. 5,430,094, issued to Gola et al. on Jul. 4, 1995, claims a stable water-based vacuum forming laminating adhesive comprising a vinyl acetate polymer, a water-dispersed polyurethane containing anionic or cationic salt groups, and an aziridine, in which the dispersion is substantially free of titratable acid. Gola indicates that the salt groups prevent the anionic or cationic group from reacting with the aziridine, and that in the absence of the potentiometrically titratable acid, the aziridine is prevented from rapidly reacting and causing an increase in viscosity.

Although stability can be achieved to some degree with these adhesive systems, they demonstrate a decline in performance properties. Thus, there is still a need for a water-based adhesive and curing system that gives stability and that also demonstrates retained heat and water resistance after storage.

SUMMARY OF THE INVENTION

This invention is a curing system for a one-part water-based adhesive that provides the stability sought by the prior art and gives improved heat and water resistance to the adhesive. The water-based adhesive will most usually comprise an aqueous emulsion of a vinyl and/or acrylic polymer and a water-dispersed ionic or nonionic polyurethane. The curing system comprises a mixture of a polyethylenimine and a carbodiimide.

In another embodiment, this invention is a stable one-part water-based laminating adhesive that comprises an aqueous emulsion of a vinyl and/or acrylic polymer or polymer, a water-dispersed polyurethane containing ionic and/or non-ionic groups, a carbodiimide and a polyethylenimine. One or more vinyl and/or acrylic polymers, polyurethanes, polyethylenimines, and carbodiimides may be present in any formulated adhesive.

These curing systems and adhesives avoid the use of aziridines and any resultant stability problems associated with aziridines. Aziridines are defined in this context as having the following structure

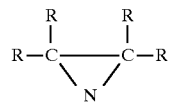

in which R represents hydrogen, an alkyl radical having 1 to 3 carbon atoms, phenyl, or any combination thereof.

The formulated adhesives demonstrate superior water and heat resistance retention over adhesives containing only carbodiimide or only polyethylenimine, or aziridine in combination with carbodiimide.

These adhesives are particularly useful for laminating flexible thermoplastic films or skins to more rigid substrates, such as in bonding or laminating polyvinylchloride (PVC) film to acrylonitrile-butadiene-styrene terpolymers (ABS plastic) or polyethylene ionomer (PE ionomer) to styrene-maleic anhydride copolymer, polyethylene foam backed PVC to sheet molding compound (SMC), or PVC film to wood board or particle board.

Specifically, the one-part water-based laminating adhesive comprises in parts by dry weight 95–5 parts vinyl and/or acrylic polymer, and 5–95 parts polyurethane containing sufficient ionic or nonionic groups to give a water-stable polyurethane dispersion, to a total of 100 parts (dry weight), and effective amounts of polyethylenimine and carbodiimide to impart sufficient heat resistance, water resistance, and adhesion to the substrates to be bonded. The effective amounts of the polyethylenimine and carbodiimide will vary depending on the substrates to be bonded, but in general will be present in some amount (greater than 0) up to about 10 parts for polyethylenimine and up to about 12 parts carbodiimide per hundred parts (pphr) dry weight of the vinyl and/or acrylic polymer and the polyurethane. Most commonly, these amounts will be in the range of 1–10 pphr polyethylenimine and 1–12 pphr carbodiimide. It is recognized that greater amounts may be used, but cost-efficiency dictates using the least amount required to obtain the adhesion properties needed.

The adhesive may contain plasticizers, thickeners, stabilizers, wetting agents, humectants and the like, in amounts known to be effective and used in the art. In general, the additives, when present, will be present in amounts known and used in the art, and typically in total will be about 2–30, preferably 5–20 pphr.

The polymers, polyethylenimine, carbodiimide and any additives are dispersed in water and delivered having an appropriate solids content taking into consideration viscosity requirements and length of drying time to remove the water. In general the solids content of the final water-based composition will be in the range of 30–70%.

In further embodiment, this invention is a method for improving the heat and water resistance of a one-part water-based laminating adhesive comprising the addition to the adhesive of the polyethlenimine and carbodiimide curing system.

In another embodiment, this invention is a process for adhering a thermoplastic material to a rigid substrate comprising (a) applying a water-based adhesive composition to the rigid substrate, wherein the adhesive comprises the following ingredients dispersed in water: a vinyl and/or acrylic polymer; a water dispersible ionic or nonionic polyurethane; polyethylenimine; and carbodiimide; (b) drying the composition; (c) heating the thermoplastic material to desired temperature; (d) contacting the preheated thermoplastic material to the dried composition; and (e) applying a vacuum to the thermoplastic material and substrate.

DETAILED DESCRIPTION OF THE INVENTION

Polyethylenimine.

The polyethylenimines are identified as those polymers having a repeating unit of N—$CH_2$—$CH_2$—N , and may be homopolymers, or polymers formed by the reaction of polyethylenimine with ethylene oxide or epichlorohydrin. These compounds are cationic polymers having no unsaturation and no aziridine rings and can be used in a wide range of molecular weights. More preferably, they will have a weight molecular weight in the range of 75,000 to 1,000,000, and most preferably in the range of 500,000 to 1,000,000. Suitable polymers are commercially available under the trademark Lupasol from BASF.

Carbodiimide.

Carbodiimide refers to both carbodiimide and substituted carbodiimides having the general structural formula $R^1$—N=C=N—$R^2$, in which $R^1$ and $R^2$ are alkyl, alkenyl, cycloalkyl, cycloalkenyl or aryl groups, such as, methyl, isopropyl, n-butyl, and cyclohexyl, or phenyl groups. Carbodiimide is also intended to include polycarbodiimide oligomers, particularly those containing alkoxysilane functions, in which the carbodiimide functionalities are connected by divalent organic groups having no reactivity with the carbodiimide functionalities. Commercially available carbodiimides may be obtained under the trademarks UCARLNK from Union Carbide, or Stabaxol from RheinChemie.

Vinyl and/or Acrylic Polymer.

The vinyl and/or acrylic polymer will be a polymer composed of those monomers known in the art as vinyl monomers, or composed of those known in the art as acrylic monomers, or a combination of those monomers. Such polymers are described for example in U.S. Pat. No. 4,659,595 issued to Walker et al. on Apr. 21, 1987; in U.S. Pat. No. 4,396,739 issued to Sirota et al. on Aug. 2, 1983; and in Skeist, Handbook of Adhesives, Chapter 21, pp 381–407 and Chapter 25, pp 437–450, Third Edition, VanNostrand Reinhold, NY (1990).

For example, a vinyl polymer may be a vinyl acetate homopolymer or a copolymer of vinyl acetate with one or more other olefinic comonomers. Typical examples of useful comonomers for vinyl acetate include ethylene, N-alkylol acrylamide or methacrylamide, acrylic acid, methacrylic acid, the alkyl esters of acrylic or methacrylic acid, α,β-unsaturated dicarboxylic acids, mono-or dialkyl esters of α,β-unsaturated dicarboxylic acids, vinyl halides, vinylidene halides, and amides of α,β-unsaturated carboxylic acids. Specific examples include methylacrylate, allyl acrylate, butyl acrylate, allylmethacrylate, diethylmaleate, diallylmaleate, dimethylfumarate, vinyl chloride, divinyl benzene, vinyl methacrylate, styrene, vinyl crotonate, vinyl versatate and divinyl adipate, diallyl adipate, diallyl phthalate, ethylene glycol diacrylate, ethylene glycol dimethacrylate, butanediol dimethacrylate, methylene bisacrylamide, triallyl cyanurate, and N-methylol acrylamide.

The acrylic polymer, for example, will be composed from the known acrylic and methacrylic monomers, including acrylic acid and methacrylic acid and esters of those acids. In addition, other comonomers for the acrylic polymer may be vinyl acetate and those as identified above as comonomers for vinyl acetate.

The polymerization may be accomplished by bulk and solution polymerization, emulsion polymerization, and suspension polymerization, using procedures known in the art.

Polyurethane Dispersion.

The polyurethanes can be prepared by methods known in the art and typically are prepared by reaction of a polyisocyanate with a polyfunctional hydroxy compound. The polyurethanes are made water dispersible by the incorporation of anionic, cationic, nonionic, or a combination of nonionic with anionic or cationic, moieties into the backbone of the urethane polymer. Preferably, these moieties are anionic or nonionic.

Such methods are disclosed, for example, in U.S. Pat. No. 5,430,094 issued to Gola et al. on Jul. 4, 1995; U.S. Pat. 4,853,061 issued to Leung on Aug. 1, 1989; U.S. Pat. No. 4,801,644 issued to Coogan on Jan. 31, 1989; and U.S. Pat. No. 3,920,598 issued to Reiff et al. on Nov. 18, 1975. In addition, general references for the manufacture and chemistry of polyurethanes can be found in Polyurethane Handbook, edited by Guenter Oertel, $2^{nd}$ edition, Hanser Publishers, New York (1994), Chapters 2 and 3, pp 11–128; in Rosthauser and Nachtkamp, "Waterborne Polyurethanes", Adv. Urethane Science and Technology, pp 121–162 (1987); and in D. Dietrich, "Aqueous Emulsions, Dispersions and solutions of Polyurethanes; Synthesis and Properties", Progress in Organic coatings, 9(1981) pp 281–340.

Suitable polyisocyanates for the formation of the polyurethanes are aliphatic or aromatic isocyanates. Representative examples are the aliphatic isocyanates such as trimethylene, tetramethylene, pentamethylene, hexamethylene, 1,2-propylene, 1,2-butylene, 2,3-butylene, and 1,3-butylene diisocyanates; the cycloalkylene compounds such as 1,3-cyclopentane, 1,4-cyclohexane, 1,2-cyclohexane diisocyanates and isophorone diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the nuclear-substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-dimethyldiphenyl methane-2, 2',5,5'-tetraisocyanate; the polymerized polyisocyanates such as tolylene diisocyanate dimers and trimers, and the like.

Suitable polyfunctional hydroxy compounds are hydroxyl terminated polyethers or polyesters. The polyethers are typically poly(oxyalkylene) derivatives of polyhydric alcohols, such as glycerol, trimethylolpropane, 1,2,6-hexanetriol, sorbitol, mannitol, pentaerythritol or sucrose. Suitable polyesters are typically prepared from reaction of a carboxylic acid and a polyol, for example, reaction between adipic acid or phthalic acid and ethylene glycol, propylene glycol, 1,3-butylene glycol, 1,4-butylene glycol, diethylene glycol, 1,2,6-hexanetriol, trimethylolpropane, or trimethylolethane.

The polyurethane will also contain ionic groups to make the polyurethane water dispersible. In the case of an anionic resin, the ionic groups are acid groups that may be selected from the class consisting of —OSO$_3^-$, —OPO$_3^-$, —COO$^-$, —SO$_2$O$^-$, —POO$^-$ and —PO$_3^-$. The polyurethane can be prepared directly with the free acid groups. Typically, the polyurethane is prepared by reacting a prepolymer having one or more isocyanate groups with compounds containing at least one acid group and one active hydrogen atom reactive with isocyanate groups, or by reacting the isocyanate, the active hydrogen containing compound (typically a polyol), and the carboxylic acid compound simultaneously.

Examples of compounds that contain active hydrogens and acid groups are hydroxy and mercapto carboxylic acids. Specific examples include dimethylol propionic acid, glycollic acid, thioglycollic acid, lactic acid, malic acid, dihydroxy malic acid, tartaric acid, dihydroxy tartaric acid, and 2,6-dihydroxy-benzoic acid. Other examples of compounds that contain active hydrogens and acid groups are aminocarboxylic acids, aminohydroxy carboxylic acids, sulfonic acids, hydroxy sulfonic acids and aminosulfonic acids. Specific examples of these include oxaluric acid, anilido acetic acid, glycine, alpha-alanine, 6-amino caproic acid, reaction product of ethanolamine and acrylic acid, hydroxy ethyl propionic acid, 2-hydroxyethane sulfonic acid and sulphanilic acid. The amino acids must be used in the presence of a base such as KOH or a tertiary amine. Other examples include bis-hydroxymethylphosphinic acid, trimethylol propane monophosphate and monosulfate, N-hydroxyethylaminoethylphosphonic acid.

A preferred polyurethane resin containing anionic functionality is DISPERCOLL KA-8713, available from Bayer Corporation, Akron, Ohio.

Besides the preferred anionic groups, the polyurethane may contain cationic groups, such as,

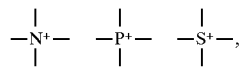

psor a combination of these groups within the polymer. Suitable materials for introducing cationic groups into the polyurethane are compounds that contain at least one active hydrogen atom reactive with isocyanate and at least one group capable of cationic formation.

The polyurethane may also contain nonionic functionality, introduced into the polyurethane by reaction of the isocyanate functionality with a polyol and/or a carboxy group containing polyol. Suitable polyols may be selected from polymeric polyols having a wide range of molecular weights, from about 60 to 6000. Mixtures of polyols may be used, especially mixtures of at least one polymeric polyol and at least one lower molecular weight polyol in addition to the carboxy group containing diol or triol.

Suitable polymeric polyols include polyethers with two or more terminal hydroxyl groups obtained by the polymerization of a cyclic oxide, for example ethylene oxide, propylene oxide and tetrahydrofuran, in the presence of a polyfunctional initiator such as water, ethylene glycol, glycerol or aniline. The polyethers and methods for their preparation have been fully described in the prior art. Especially suitable polyethers include polypropylene ether glycols, poly (propylene-ethylene) ether glycols and polytetramethylene ether glycols having molecular weights in the range of from 500 to 6000.

Other suitable polymeric polyols include polyester polyols such as may be prepared by reacting polyhydric, especially dihydric, alcohols such as ethylene glycol, diethylene glycol or propylene glycol with polycarboxylic, especially dicarboxylic, acids or their ester-forming derivatives, for example succinic, glutaric and adipic acids and phthalic and tetrachlorophthalic anhydrides. Polyesters may also be obtained by the polymerization of lactones, for example caprolactone, in conjunction with a polyol.

Still other suitable polymeric polyols include polythioethers, polyacetals, polycarbonates and polyolefins such as have already been described in the urethane art.

Lower molecular weight polyols useful in making the prepolymers include ethylene glycol, propylene glycol, diethylene glycol, trimethylolpropane, glycerol, cyclohexane dimethanol (1,4-bis-hydroxymethylcyclohexane), furan dimethanol, bis-2-hydroxyethylhydroquinone, and hydroxyethyl esters of phthalic acids.

The carboxy group containing polyol used in making the prepolymer may be a dihydroxy alkanoic acid of the formula:

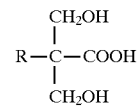

pswherein R is hydrogen or alkyl. The preferred carboxy containing diol is 2,2-dimethylol propionic acid. If desired, the carboxy-containing polyol may be incorporated into a polyester by reaction with a dicarboxylic acid before being incorporated into the prepolymer.

Additives:

These formulations may additionally contain such additives as plasticizers, stabilizers fillers, thickeners, humectants, and wetting agents, all of which are known and used in known amounts in the art.

Examples of suitable plasticizers include dibutyl phthalate, ethyl butyl phthalate, butyl benzyl phthalate, aryl sulfonamides such as N-ethyl-o- and p-toluene sulfonamide, polymeric ester plasticizers, poly(alkyleneoxy) ethers of phenols such as nonylphenoxy poly(ethyleneoxy) ethanols and the like, and propylene glycol and other similar compositions. In addition, materials known as tackifiers or softening agents may be used.

Examples of suitable stabilizers are various ionic and nonionic surfactants and dispersants, such as those sold under the tradenames Triton X100 or Tamol 731 by Rohm & Haas, and Aerosol OT by American Cyanamide.

Examples of suitable humectants are glycerin, triethylene glycol, n-methylpyrolidone, propylene glycol and urea.

Examples of suitable thickeners or protective colloids include polyvinyl alcohol, polyvinyl pyrrolidine, polyvinyl pyrrolidine-acetate copolymer, hydroxyethyl cellulose, polyacrylamide, xanthan gum, polyurethane associative thickeners.

Examples of suitable fillers include clay, calcium carbonate, mica, polymeric microspheres, feldspar, and the like.

Solvents or diluents may also be added, and these include N-methylpyrrolidone, toluene, and 1,1,1-trichloroethane, and like compounds.

Process for Bonding.

The present invention is also directed toward a process for adhering thermoplastic material to a rigid substrate using the above-described water-based adhesive composition. A common industrial use for this process is the bonding of thermoplastic material to structural parts in automobiles, although the process is useful in applying material to many substrates. Typically, the substrate will be acrylonitrile-butadiene-styrene terpolymers (ABS), high impact polystyrene, styrene-acrylonitrile copolymers, polyvinyl chloride, polycarbonate, high density polyethylene, polyphenylene oxide, and fiberboard.

The thermoplastic material can be any such material known to those skilled in the art. Such material includes, without limitation, polyvinyl chloride, polyolefin, cloth, and polyurethane.

The process comprises applying the water borne composition to a substrate, drying the composition, heating and softening the flexible material to be applied to the substrate, contacting the flexible material to the substrate, and vacuum forming the flexible material onto the substrate.

Application of the waterborne adhesive to the substrate can be achieved in any manner known to those skilled in the art, and includes, for example, spraying or brushing the adhesive onto the substrate. The adhesive is typically applied at film thicknesses of between about 1 mil and about 15 mils, and more typically between about 3 mils and about 7 mils or 30–80 g/m$^2$ dry deposit.

Drying of the composition on the substrate can be achieved by allowing the coated substrate to air dry at room temperature or by actively drying the composition with elevated temperatures. Depending on the temperature, humidity, and film thickness, drying of the composition on the substrate can take from several minutes to one hour or more. For example, a film at a thickness of about 5 mils can be dried in a 70° C., oven in about between 4 to 6 minutes.

After drying the composition or during the drying of the composition, the thermoplastic flexible material to be laminated to the substrate is heated to softening, usually to a temperature between about 110° C. to about 180° C. The heated material and rigid substrate are then brought into contact.

A vacuum is applied to the flexible material, which is draped over the rigid substrate, to draw the material into all recessed areas of the substrate. Typically, the vacuum is drawn for at least about 10–20 seconds. In the case of porous materials, such as fiberboard, a vacuum can be achieved directly through the substrate without placing holes in the substrate. In the case of substrates that are not porous, holes are made in the substrate so that a vacuum can pull the flexible material onto the substrate.

After the vacuum is applied, the adhesive composition will fully cure to give heat and water resistance at room temperature in about 3–5 days. Cure can be accelerated by heating the laminated substrate.

EXAMPLES

The following examples illustrate the properties of the inventive adhesive compositions, and compare those properties to compositions containing aziridine and carbodiimide, solely polyethyleneimine, and solely carbodiimide.

Sample Preparation.

The adhesives were prepared as described below and used to bond flexible thermoplastic skins or membranes to rigid substrates (panels) using standard vacuum forming operations. To effect the adhesive application, the adhesive was sprayed or drawn down on the panel and dried in an oven. Then the adhesive coated panel was held for several minutes at room temperature (open time) before being contacted with a preheated flexible skin.

To effect the vacuum forming, the flexible skin was preheated sufficiently to increase its plasticity, contacted to the adhesive coated side of the rigid panel, and a vacuum applied to mold the flexible skin to the panel assembly. Temperature was measured at the adhesive layer (referred to as the glueline temperature).

Each of these panels measured 75mm×25mm. A 25mm section of flexible skin, measured from the 75mm dimension, was not bonded to the rigid substrate but kept free as a lead to which weights were affixed for testing performance properties.

After the vacuum forming operation, the panel assemblies were cured at 20° C. for 3–5 days before testing.

Preparation Conditions for Vacuum Formed Test Panels.

Two panel assemblies of flexible skin and rigid substrate were chosen for testing: A Corona treated film of a 14 mil thick polyethylene ionomer (PE ionomer), sold under the trademark Surlyn by DuPont, was bonded to a styrene maleic anhydride copolymer reinforced with fiber glass, sold under the trademark Dylark 378P20 by Arco. This panel assembly is hereinafter identified as PE ionomer/SMA copolymer. A polyvinylchloride film backed with polyethylene foam (PEF), sold by O'Sullivan with a primer identified as OSL—3, was bonded to sheet molding compound (SMC), made by Goodyear. This panel assembly is hereinafter identified as PEF/SMC. The adhesives for all panels were applied to the rigid substrates using a #70 wire bar. The vacuum forming conditions for these assemblies were the following:

| Vacuum Forming Conditions for PE ionomer/SMA copolymer | |
|---|---|
| Adhesive Application: | |
| Adhesive Deposit: | 35 g/m$^2$ (dry weight) |
| Drying Time and Temp: | 7 min. 65° C. (150° F.) |
| Open Time: | 5 min. |
| Vacuum Forming Conditions | |
| PE ionomer Preheat: | 12 seconds |
| Vacuum Dwell: | 20 seconds/20" Hg |
| Glueline Temp.: | 63° C. (145° F.) |
| Vacuum Forming Conditions for PEF/SMC | |
| Adhesive Application | |
| Adhesive Deposit: | 35 g/m$^2$ (dry) |
| Drying Time and Temp: | 10 min. 65° C. (150° F.) |
| Open Time: | 5 min. |
| Vacuum Forming Conditions | |
| PEF Preheat: | 60 seconds |
| Vacuum Dwell: | 30 sec./22" Hg |
| Glueline Temp.: | 68° C. (155° F.) |

Test Protocols. Peel adhesion (180°) was measured on an Instron tensile tester using 30cm/min crosshead speed. Measurements were taken at room temperature, after conditioning at 98% relative humidity/37° C. for 24 hours, and after immersion in room temperature water for 24 hours.

Hot Creep was measured in mm delamination of the flexible skin from the rigid substrate at elevated temperatures. The panel was secured in a horizontal position relative to the ground with the unbonded lead portion of the flexible skin facing downward. A 200g weight was hung from this lead portion so that the lead portion made a 90° angle with the bonded panel. In this position, the panel assembly was placed in an air circulating oven with the initial temperature set to 82° C. The temperature was increased 5–6° C. every 90 minutes, and delamination in mm was measured for each temperature.

Water Immersion Creep was measured with the same set-up and 200g weight as just described, except that the assembly was immersed in room temperature water until delamination occurred. Delamination was measured against time.

Adhesive Formulations.

Adhesive formulations were prepared by blending the ingredients with moderate mixing. Typically, the vinyl acetate emulsion was added first to the mixing vessel and stirred to effect a vortex. The polyethylenimine was added slowly to this vinyl acetate emulsion. When that addition was completed the other ingredients were added slowly with continued stirring, with the polyurethane dispersion being added last. The formulations were made to a solids content of about 45%. The ingredients and amounts in which they were used are set out in Table I. The trademarks, generic descriptions, and sources for the ingredients are listed in the Notes after the Table.

TABLE I

Adhesive Formulations in parts by dry weight

| Sample | A | B | F | D | C | E | G |
|---|---|---|---|---|---|---|---|
| (1) polyvinyl acetate | 60 | 60 | 60 | 60 | 60 | 60 | 60 |
| (2) polyurethane resin | 40 | 40 | 40 | 40 | 40 | 40 | 40 |
| (3) polyethylene imine | 3 | 3 | 1.5 | — | — | — | — |
| (4) aziridine | — | — | — | — | — | 6 | — |
| (5) carbodiimide | 6 | — | — | 6 | 3.5 | 3.5 | — |
| (6) plasticizer | 11 | 11 | 11 | 11 | 11 | 11 | 11 |
| (7) N-methylpyrolidone | 7 | 7 | 7 | 7 | 7 | 7 | 7 |
| (8) thickener | 2.1 | 2.1 | 2.1 | 2.1 | 2.1 | 2.1 | 2.1 |
| (9) triethanolamine | — | — | — | 2.2 | 2.2 | 2.2 | — | psNotes on reagents:
(1) Airflex 465, a 65 weight percent ethylenevinyl acetate emulsion, available from Air Products, Allentown, PA
(2) Dispercoll KA8713, a 40 weight percent ionic polyurethane resin dispersed in water, available from Bayer Corporation, Akron, Ohio. The resin is derived from hexamethylene diisocyanate and isophorone diisocyanate and a polyester polyol. It has a dispersion specific gravity at 23° C. of about 1.20 gram/cm$^3$, a viscosity at 23° C. of less than 600 cps., and a pH of 6–8.5.
(3) Lupasol-P; a 50 weight percent ethylene imine homopolymer dispersed in water, available from BASF Corp., Rensselaer, N.Y.
(4) CX100; a polyfunctional aziridine crosslinker, 100 percent solids, available from Zeneca Resins, Wilmington, MA. (1-aziridinepropanoic acid, 2-methyl-,2-ethyl-2-{{3-(2-methyl-1-aziridinyl)-1-oxopropoxy}-methyl}-1,2-propandiyl ester;)
(5) Ucarlink XL29SE; a 50 weight percent multifunctional carbodiimide in methyl propasol acetate, available from Union Carbide, Danbury, CT.
(6) Santicizer 160, a 100% solid butyl benzyl phthalate, available from Monsanto.
(7) M-pyrol-(N-methylpryolidone); available from Arco or BASF Corp.
(8) Coatex BR-100; a 50 weight percent associative thickener, available from Polacryl Corp., Stamford, CT.

EXAMPLE I

Effect of polyethylene imine (PEI). Formulation Sample A was varied by changing the amount of polyethylene imine from three parts per hundred parts of resin (pphr) to two parts (sample $A_2$) and one part (sample $A_1$). These three formulations were tested to optimize the level of PEI using the test protocols described above. The results are set out in Tables II-a and II-b for polyethylene ionomer laminated to styrene maleic anhydride copolymer and in Tables III-a and III-b for polyethylene foam backed vinyl laminated to sheet molding compound, and are given in N/cm as the force required to peel the flexible skin from the rigid substrate. The data show that the amount of PEI may be varied to optimize a desired property.

TABLE II-a

PE ionomer/SMA copolymer
Bond Performance-Peel

| | Peel 30cm/min RT | | Peel 30cm/min 98%/RH/37° C./24hrs | |
|---|---|---|---|---|
| ADH | N/cm | fail mode | N/cm | fail mode |
| $A_1$ | 8.1 | r | 6.9 | r |
| $A_2$ | 9.0 | r | 6.2 | r |
| A | 7.4 | r | 8.7 | r |

Notes: r = failed adhesively to rigid (SMA) substrate

TABLE II-b

PE ionomer/SMA copolymer
Bond Performance-Creep

| | Creep in mm with 200 g weight 5°–6° C./90 min increments | | | | | | Creep in mm with 200 g during water immersion | |
|---|---|---|---|---|---|---|---|---|
| ADH | 82° C. | 87° C. | 93° C. | 99° C. | 105° C. | 110° C. | Time | (mm) |
| $A_1$ | 0 | 0 | 0 | 0 | 4 | S/M | 24 hrs. | 0 |
| $A_2$ | 0 | 0 | 0 | 0 | 4 | S/M | 24 hrs. | 0 |
| A | 0 | 0 | 0 | 0 | 4 | S/M | 24 hrs | 0 |

Notes:
S/M = flexible substrate (PE ionomer) melted

TABLE III-a

PEF/SMC
Bond Performance-Peel

| | Peel 30cm/min room temp | | Peel 30cm/min after 24 hrs water immersion | |
|---|---|---|---|---|
| ADH | N/cm | fail mode | N/cm | fail mode |
| $A_1$ | 17.7 | F/T | 15.4 | F/T |
| $A_2$ | 17.9 | F/T | 20.5 | F/T |
| A | 17.2 | F/T | 16.3 | F/T |

Notes F/T polyethylene foam tear

TABLE III-b

PEF/SMC
Bond Performance-Creep

Creep in mm with 200 g weight
5°–6° C./90 min. increments

| ADH | 82° C. | 87° C. | 93° C. | 99° C. | 105° C. | 110° C. |
|---|---|---|---|---|---|---|
| $A_1$ | 8 | 20 | 35 | 40 | ⇓ pef | ⇓ pef |
| $A_2$ | 4 | 12 | 25 | 40 | ⇓ pef | ⇓ pef |
| A | 0 | 3 | 4 | 10 | 13 | 13 |

Notes:
pef = failed adhesively to polyethlene foam
⇓ = complete adhesive failure

TABLE IV-a

PE ionomer/SMA copolymer
Bond Performance-Peel

| | Peel 30cm/min room temp | | Peel 30cm/min 98%/RH/37° C./24 hrs | |
|---|---|---|---|---|
| ADH | N/cm | fail mode | N/cm | fail mode |
| A | 7.4 | r | 8.7 | r |
| B | 2.1 | fl | 1.1 | fl |
| F | 1.3 | fl | 0.9 | fl |
| D | 5.9 | r,fl | 5.9 | r,fl |
| C | 7.6 | r | 4.1 | fl |
| E | 7.1 | r | 4.8 | fl |
| G | 0.0 | fl | 0.0 | fl |

Notes: r = failed adhesively to rigid (SMA) substrate
fl = failed adhesively to flexible (PE ionomer) substrate

TABLE IV-b

PE ionomer/SMA copolymer
Bond Performance-Creep

| | Creep in mm with 200 g weight 5°–6° C./90 min increments | | | | | | Creep in mm with 200 g during water immersion. | |
|---|---|---|---|---|---|---|---|---|
| ADH | 82° C. | 87° C. | 93° C. | 99° C. | 105° C. | 110° C. | Time | (mm) |
| $A_1$ | 0 | 0 | 0 | 0 | 4 | ⇓ S/M | 24 hrs. | 0 |
| B | 3 | 3 | 12 | 20 | ⇓ S/M | ⇓ S/M | 10 sec. | |
| F | 5 | 6 | 8 | 25 | ⇓ S/M | ⇓ S/M | 30 sec. | |
| D | 2 | 3 | 9 | 13 | 20 ⇓ S/M | ⇓ S/M | 1 min. | |
| C | 16 | 25 | 35 | ⇓ | ⇓ | ⇓ S/M | 5 min. | |
| E | 1 | 2 | 3 | 4 | 8 | ⇓ S/M | 4 hrs. | |
| G | ⇓ | ⇓ | ⇓ | ⇓ | ⇓ | ⇓ | 5 sec. | ⇓ |

Notes:
S/M = flexible substrate melted
⇓ = complete adhesive failure

EXAMPLE II

Adhesive formulations A through G were prepared and tested according to the above test protocols in order to assess performance based on the presence of the polyethylenimine. The results are set out in Tables IV-a, IV-b, V-a, and V-b, and show that the formulations containing carbodiimide, or PEI, or aziridine and carbodiimide, do not perform as well as the formulations containing the combination of carbodiimide and polyethyleneimine. The data also show that only formulation A containing the carbodiimide and polyethylenimine retains a suitably useful peel strength after aging at 98% humidity and 37° C. for 24 hours, and also retains good creep resistance during heat and water exposure.

TABLE V-a

PEF/SMC
Bond Performance-Peel

| | Peel 30cm/min room temp* | | Peel 30cm/min after 24 hrs water immersion | |
|---|---|---|---|---|
| ADH | N/cm | fail mode | N/cm | fail mode |
| A | 17.2 | F/T | 16.2 | F/T |
| B | 18.2 | F/T | 2.0 | smc |
| F | 7.0 | pef | 0.5 | smc |
| D | 17.3 | F/T | 4.4 | smc |
| C | 15.6 | F/T | 4.4 | pef |
| E | 15.6 | F/T | 15.6 | F/T |
| G | 1.80 | pef | 0.0 | pef |

Notes: F/T = polyethylene foam tear
smc = failed adhesively to SMC
pef = failed adhesively to PEF

TABLE V-b

PEF/SMC Bond Performance-Creep

Creep in mm with 200 g weight 5°–6° C./90 min. increments

| ADH | 82° C. | 87° C. | 93° C. | 99° C. | 105° C. | 110° C. |
|---|---|---|---|---|---|---|
| A | 0 | 3 | 4 | 10 | 13 | 13 |
| B | 3 | 5 | 9 | 12 | 27 | ⇓ |
| F | 0 | 3 | 5 | 10 | 13 | 14 |
| D | 5 | 15 | 28 | ⇓ | ⇓ | ⇓ |
| C | 25 | ⇓ | ⇓ | ⇓ | ⇓ | ⇓ |
| E | 3 | 8 | 8 | 10 | 10 | 12 |
| G | ⇓ | ⇓ | ⇓ | ⇓ | ⇓ | ⇓ |

Notes:
⇓ = complete adhesive failure

EXAMPLE III

Sample formulations A and E were aged 2 weeks at 40° C. This accelerated aging is intended to be predictive of commercial long term storage. After aging, the formulations were used to make test panels as previously described, and the panels were tested according to the Test Protocols described above. The results are set out in Tables VI-a, VI-b, VII-a, and VII-b and show that the inventive formulation A gave superior heat and water resistance after the accelerated aging, demonstrating that this one-part system has good storage stability and superior performance.

TABLE VI-a

Aged Adhesive** PE ionomer/SMA copolymer Bond Performance-Peel

| | Peel 30cm/min room temp | | Peel 30cm/min 98%/RH/37° C./24 hrs | |
|---|---|---|---|---|
| ADH | N/cm | fail mode | N/cm | fail mode |
| A initial | 7.4 | r | 8.6 | r |
| A aged | 7.1 | r | 5.1 | r,fl |
| E initial | 7.1 | r | 4.8 | fl |
| E aged | 3.5 | r | 2.7 | fl |

Notes: r = failed adhesively to rigid substrate
fl = failed adhesively to flexible substrate

TABLE VI-b

Aged Adhesive** PE ionomer/SMA copolymer Bond Performance-Creep

| | Creep in mm with 200 g weight 5°–6° C./90 min increments | | | | | | Creep in mm with 200 g weight during water immersion | |
|---|---|---|---|---|---|---|---|---|
| ADH | 82° C. | 87° C. | 93° C. | 99° C. | 105° C. | 110° C. | Time | (mm) |
| A initial | 0 | 0 | 0 | 0 | 0 | ⇓ S/M | 24 hrs. | 0 |
| A aged | 1 | 1 | 1 | 2 | 4 | S/M | 24 hrs. | 0 |
| E initial | 1 | 2 | 3 | 4 | 8 | S/M | 4 hrs. | ⇓ |
| E aged | 10 | 20 | 40 | ⇓ | ⇓ | ⇓ | 1 min. | ⇓ |

Notes:
S/M = flexible substrate melted
⇓ = complete adhesive failure

TABLE VII-a

Aged Adhesive** SMC/PEF Bond Performance-Peel

| | Peel 30cm/min room temp * | | Peel 30cm/min after 24 hrs. water immersion | |
|---|---|---|---|---|
| ADH | N/cm | fail mode | N/cm | fail mode |
| A initial | 17.2 | F/T | 16.3 F/T | F/T |
| A aged | 16.5 | F/T | 9.1 AF/smc | smc |
| E initial | 15.6 | F/T | 15.6 | F/T |
| E aged | 15.2 | F/T | 1.8 | smc |

Notes: smc = failed adhesively to SMC
F/T = polyethylene foam tear

TABLE VII-b

Aged Adhesive* SMC/PEF Bond Performance-Creep

Creep in mm with 200 g weight 5°–6° C./90 min. increments

| ADH | 82° C. | 87° C. | 93° C. | 99° C. | 105° C. | 110° C. |
|---|---|---|---|---|---|---|
| A initial | 0 | 3 | 4 | 10 | 13 | 13 |
| A aged | 1 | 2 | 8 | 21 | 27 | 27 |
| E initial | 3 | 8 | 8 | 10 | 10 | 12 |
| E aged | 2 | 10 | ⇓ | ⇓ | ⇓ | ⇓ |

Notes:
⇓ = complete adhesive failure

EXAMPLE 4

Adhesive formulation A was held over a four week period at 40° C. with no increase in viscosity, indicating minimal or no crosslinking, and demonstrating that it can be used as a stable one-part adhesive composition. The initial viscosity of the adhesive was 2900 MPa.s; at the end of two weeks at 40° C. it exhibited a viscosity of 2700 MPa.s; at the end of four weeks at 40° C. it exhibited a viscosity of 2500 MPa.s.

What is claimed:

1. A stable one-part water-based laminating adhesive composition comprising the following ingredients dispersed in water to a solids content of 30–70% by weight:

(a) a vinyl and/or acrylic polymer;

(b) a n ionic or nonionic polyurethane;

(c) a polyethylenimine; and (d) a carbodiimide.

2. The adhesive composition according to claim 1 in which:
 (a) the vinyl and/or acrylic polymer is present in an amount of 5–95 parts by weight and
 (b) the polyurethane is present in an amount of 95–5 parts by weight, the total of (a) and (b) being 100 parts by dry weight;
 (c) the polyethylenimine is present in an amount greater than 0 and up to about 10 parts per hundred parts total of the vinyl and/or acrylic polymer and the ionic or nonionic polyurethane; and
 (d) the carbodiimide is present in an amount greater than 0 and up to about 12 parts per hundred parts total of the vinyl and/or acrylic polymer and the ionic or nonionic polyurethane.

3. The adhesive composition according to claim 1 in which the vinyl and/or acrylic polymer is a copolymer of ethylene and vinyl acetate.

4. The adhesive composition according to claim 1 in which the polyethylenimine is a homopolymer of ethylene imine.

5. A process for adhering a themoplastic material to a rigid substrate comprising
 (a) applying a water based composition to the rigid substrate, wherein the composition comprises the following ingredients dispersed in water:
  (i) a vinyl and/or acrylic polymer;
  (ii) a water dispersible ionic or nonionic polyurethane;
  (iii) polyethylenimine; and
  (iv) carbodiimide;
 (b) drying the composition;
 (c) heating the thermoplastic material to desired temperature;
 (d) contacting the preheated thermoplastic material to the dried composition; and
 (e) applying a vacuum to the thermoplastic material and substrate.

6. A method for improving the heat and water resistance of a one-part water-based laminating adhesive containing a vinyl and/or acrylic polymer and an ionic or nonionic water dispersible polyurethane in a total of 100 parts by dry weight comprising adding to the water-based adhesive a curing system comprising a polyethylenimine and a carbodiimide.

7. The method according to claim 6 in which the polyethylenimine is present in an amount up to about 10 parts, and the carbodiimide is present in an amount up to about 12 parts, per hundred parts by dry weight of the vinyl and/or acrylic polymer and the anionic or nonionic water dispersible polyurethane.

* * * * *